United States Patent

[11] 3,582,970

| [72] | Inventors | Richard E. Williams |
| | | Reston; |
| | | Julian A. Scott, Rockville |
| [21] | Appl. No. | 738,245 |
| [22] | Filed | June 19, 1968 |
| [45] | Patented | June 1, 1971 |
| [73] | Assignee | Scope Incorporated |
| | | Reston, Va. |

[54] ROCKET AND JET ENGINE DETECTOR
4 Claims, 3 Drawing Figs.

| [52] | U.S. Cl. | 250/83.3 |
| [51] | Int. Cl. | G01t 1/16 |
| [50] | Field of Search | 250/83.3 |
| | | IR, 203 |

[56] References Cited
UNITED STATES PATENTS

| 3,043,956 | 7/1962 | Cohen | 250/83.3 |
| 3,096,650 | 7/1963 | Lowenstein et al. | 250/83.3X |
| 3,056,106 | 9/1962 | Hendricks | 250/83.3X |
| 3,317,731 | 5/1967 | Webb | 250/203 |

*Primary Examiner*—James W. Lawrence
*Assistant Examiner*—Davis L. Willis
*Attorney*—Schulze, Blair & Benoit

ABSTRACT: A rocket and jet engine detector for investigating the amplitude modulation of the infrared energy produced by the engines including an infrared detector, a high pass filter for rejecting amplitude modulation at frequencies below about 500 Hz. and a threshold trigger coupled to the filter for providing an output signal.

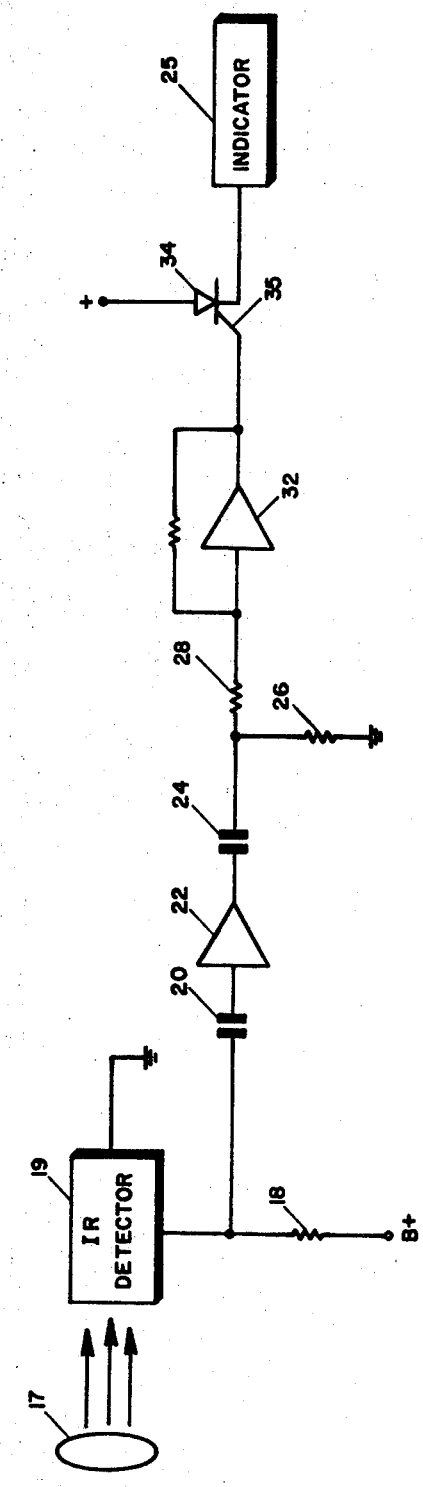

ROCKET AND JET ENGINE DETECTOR

This invention relates generally to rocket and jet engine detectors and more specifically to a means for utilizing amplitude modulation of the infrared energy produced by jet and rocket engines.

Infrared receivers have been designed and used to a limited extent to detect and/or track small rockets and jet engines. However, such receivers in use today have historically been plagued by extremely high false alarm rates. Most of the receivers have used, as a decision criteria, a simple measurement of the total amount of energy present at a particular IR wavelength produced by the engine. A few receivers use additional information such as the length of time the energy is present, the rate of rise and fall of the energy levels, and/or the relative energy in two different spectral regions. However, all of these systems have used extremely narrow information bandwidths, typically 5 Hz. to 10 Hz. based at DC.

Available information indicates that most of the infrared sources which cause false alarms in detector systems are essentially DC sources, but that their radiation is amplitude modulated by atmospheric turbulence. This particular modulation appears to have a characteristic $1/f$ curve; that is, the energy in a particular modulation frequency is inversely proportional to the frequency itself. This indicates that there is almost no energy generated by atmospheric turbulence at amplitude modulation frequencies above about 500 Hz.

However, jet and rocket engines themselves amplitude modulate the infrared energy over a particular spectrum. Although the exact reasons for such amplitude modulation are not as yet clear, it has been proven that this modulation does in fact occur.

It has also been shown that the amplitude modulation frequencies issuing from the exhaust of a jet or rocket engine occur substantially beyond the 500 Hz. range.

Accordingly, it is an object of this invention to provide a system for detecting jet and rocket engines wherein atmospheric turbulence is substantially eliminated as a false alarm source.

A further object of this invention is to monitor the amplitude modulated infrared energy issuing from the exhaust of jet and rocket engines above modulation frequencies of about 500 Hz.

Another object is to utilize higher frequency components of the amplitude modulation as a multiplicity of carriers to process the signals through AC coupled amplifiers.

These and other objects of this invention will be more clearly understood from the following description when taken in conjunction with the drawings wherein:

FIG. 3 is a detailed circuit showing one system for practicing the present invention.

Briefly, the present invention comprises infrared radiation detecting means for providing output signals indicative of the amplitude modulation of infrared radiation produced by jet and rocket engines, filter means coupled to the output of the detecting means for rejecting that component of the amplitude modulated radiation below a predetermined frequency and indicator means coupled to the output of the filter means.

Figure 1:
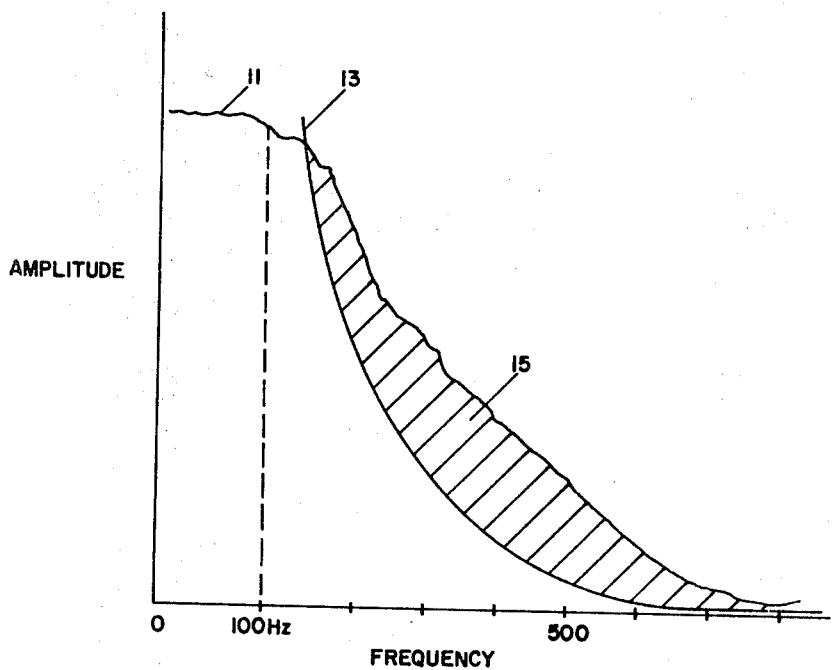
FIG. 1 is a graphical illustration of the modulation spectrums of typical jet and rocket engines and of atmospheric turbulence.

Turning now more particularly to FIG. 1, there is shown a graphical plot of a typical amplitude modulation spectrum 11 of a rocket or jet engine. Also, there is shown a typical amplitude modulation spectrum 13 which represents that modulation caused by atmospheric turbulence.

As can be seen in FIG. 1, the amplitude modulation of the atmospheric turbulence has a characteristic $1/f$ curve and drops rapidly as it approaches 500 Hz. As a result of this, there is substantially no energy available from this source of amplitude modulation at frequencies above 500 Hz.

However, the modulation spectrum 11 relative to the jet and rocket engines extends further into the upper frequency regions so as to provide a region shown by shaded area 15 including a substantial portion above 500 Hz. which may be investigated without including any appreciable atmospheric turbulence modulation. Therefore, indications which are received above 500 Hz. will be substantially free of the major source of false alarm signals in present day infrared jet and rocket engine detectors.

Figure 2:
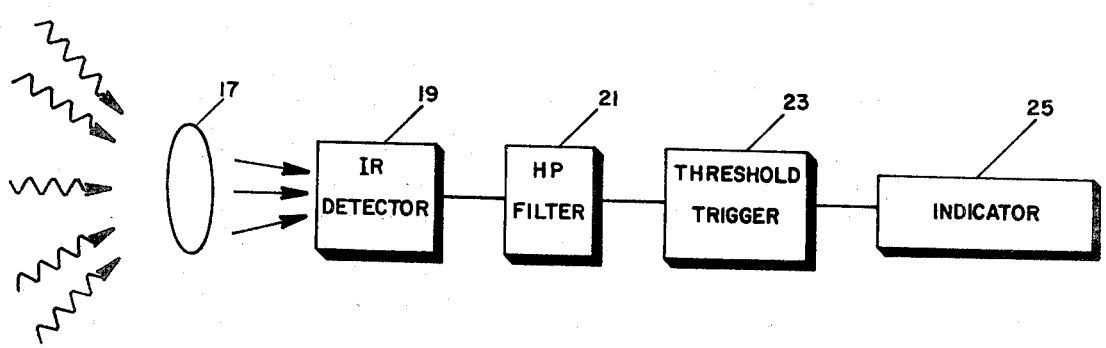
FIG. 2 is a schematic illustration of the present invention.

FIG. 2 illustrates a system for investigating the region 15 of FIG. 1. There is shown a typical, preferably wide angle, optical system 17 and a standard IR detector 19. The output of the detector 19 is passed through high pass filter 21 which is set to a predetermined frequency of approximately 500 Hz. and the output of filter 21 is applied to a threshold trigger 23 and ultimately to an indicator 25 which could be an electric light bulb.

FIG. 3 illustrates one particular circuit diagram for providing the desired output signal of the present invention. Again, the typical optics 17 and IR detector 19 are shown with a bias voltage applied through resistor 18. The output of detector 19 passes through capacitor 20 to an AC coupled amplifier 22. The output of amplifier 22 is passed through the filter circuit including capacitor 24 and resistors 26 and 28 and through operational amplifier 32.

In the circuit in FIG. 3 the threshold trigger is indicated as a silicon-controlled rectifier 34 wherein the gate 35 is coupled to the output of the operational amplifier. At any time that the total energy output from the operational amplifier exceeds a predetermined value, gate 35 will cause the silicon-controlled rectifier to conduct and the indicator 25, such as a lamp, will be lighted to show that a jet or rocket engine has beet detected.

It can be seen that the present invention greatly simplifies the equipment necessary to detect jet and rocket engines while substantially reducing false alarm rates from extraneous sources and, for all practical purposes, eliminates such false alarm rates caused by atmospheric turbulence.

The system is further simplified due to the fact that there is no chopper needed in connection with the infrared detector. AC coupled amplifiers (with attendant stability) utilize implicit high frequency carriers in the signal instead.

The above description and drawings are to be considered illustrative only in view of the fact that various other individual components could be used in the system and still obtain the desired method and means for detection. Accordingly, this invention is to be limited only by the scope of the following claims.

We claim:

1. A rocket and jet engine detector comprising
   means for detecting the amplitude modulation of the infrared energy produced by said engine,
   filter means coupled to the output of said detecting means for rejecting that component of said output signal below a predetermined frequency of about 500 Hz. so as to eliminate the modulation of said signal by atmospheric turbulence,
   threshold trigger means coupled to the output of said filter means, and
   indicating means coupled to the output of said trigger means.

2. A device for detecting the amplitude modulated infrared radiation produced by jet and rocket engines comprising
   infrared radiation detecting means for providing an output signal generated by said amplitude modulated radiation,
   filter means coupled to the output of said detecting means for rejecting that component of said amplitude modulated radiation below a predetermined frequency of about 500 Hz. so as to eliminate the modulation of said signal by atmospheric turbulence, and
   indicator means coupled to the output of said filter means.

3. The device of claim 2 wherein said indicating means comprises
   a threshold trigger, and
   a signal indicator.

4. A method of monitoring the amplitude modulated infrared energy produced by jet and rocket engines which consists of
  detecting said amplitude modulated infrared energy,
  filtering said detected amplitude modulated infrared energy so as to reject said modulated energy below a predetermined frequency of about 500 Hz. so as to eliminate the modulation of said signal by atmospheric turbulence, and providing a signal indicative of said filtered energy.